(12) United States Patent
Kaya

(10) Patent No.: US 7,742,290 B1
(45) Date of Patent: Jun. 22, 2010

(54) PORTABLE COMPUTER WITH FLIP KEYBOARD

(75) Inventor: H. Giray Kaya, Cedar Park, TX (US)

(73) Assignee: Motion Computing, Inc., Austin, TX (US)

( * ) Notice: Subject to any disclaimer, the term of this patent is extended or adjusted under 35 U.S.C. 154(b) by 145 days.

(21) Appl. No.: 11/692,688

(22) Filed: Mar. 28, 2007

(51) Int. Cl.
*G06F 1/16* (2006.01)
*G06F 3/02* (2006.01)
*G06F 3/041* (2006.01)

(52) U.S. Cl. .............................. 361/679.3; 361/679.55; 361/679.27; 345/169; 345/173; 248/922

(58) Field of Classification Search ................. 361/683, 361/679, 681, 679.01–679.45, 679.55–679.59; 345/173–178, 156, 168, 157, 169; 455/575.1, 455/575.3, 575.4
See application file for complete search history.

(56) References Cited

U.S. PATENT DOCUMENTS

| 4,890,832 | A  | * | 1/1990  | Komaki ......................... 463/44 |
| 5,283,862 | A  |   | 2/1994  | Lund |
| 5,706,030 | A  |   | 1/1998  | Ishigami et al. |
| 5,802,544 | A  | * | 9/1998  | Combs et al. .................. 711/5 |
| 5,952,998 | A  |   | 9/1999  | Clancy et al. |
| 6,259,597 | B1 | * | 7/2001  | Anzai et al. .................. 361/683 |
| 6,628,269 | B2 |   | 9/2003  | Shimizu |
| 6,776,546 | B2 |   | 8/2004  | Kraus et al. |
| 6,822,635 | B2 |   | 11/2004 | Shahoian et al. |
| 7,098,896 | B2 |   | 8/2006  | Kushler et al. |
| 7,126,589 | B2 |   | 10/2006 | Sung |
| 7,157,649 | B2 |   | 1/2007  | Hill |
| 7,479,943 | B1 | * | 1/2009  | Lunsford et al. ............. 345/157 |
| 2001/0006006 | A1 | * | 7/2001 | Hill ............................. 73/606 |
| 2003/0160754 | A1 | * | 8/2003 | Hanson et al. ............... 345/156 |
| 2004/0198307 | A1 | * | 10/2004 | Chang ........................ 455/348 |
| 2006/0111160 | A1 | * | 5/2006 | Lin et al. .................. 455/575.3 |

* cited by examiner

*Primary Examiner*—Jayprakash N Gandhi
*Assistant Examiner*—Nidhi Desai
(74) *Attorney, Agent, or Firm*—Charles D. Huston; Daffer McDaniel, LLP

(57) ABSTRACT

A portable computer, such as a tablet personal computer, is provided having a display screen, a transparent input panel, and a hinge. The hinge can secure the input panel over the display screen when in a closed position, or secure the input panel away from the display screen when in an opened position. At least one of the opposed first and second planar surfaces of the input panel are contact-sensitive. At least one of the first and second surfaces can also include a resistive film or a capacitive film. Transceivers can be mounted on the computer near the lateral extents of the input panel for measuring acoustic, magnetic, electromagnetic, or optical signals transmitted across a surface of the input panel to detect where an object is placed upon or near the input panel. The input panel can also accommodate a template containing a QWERTY keyboard. When the input panel is opened and the keyboard template is inserted thereon, the input panel can receive keyboard input; when closed, the input panel can receive a stylus or fingertip input.

17 Claims, 3 Drawing Sheets

PORTABLE COMPUTER WITH FLIP KEYBOARD

BACKGROUND OF THE INVENTION

1. Field of the Invention

The present invention relates in general to the field of computers and, more particularly, to a portable computer having a flip keyboard that presents itself to a user when opened from the portable computer.

2. Description of the Related Art

The following descriptions and examples are not admitted to be prior art by virtue of their inclusion within this section.

A typical computer generally has an input device on which information can be entered into the computer by a user. There are different forms of input devices available in the marketplace, depending on the amount of information being entered and the overall form factor (size) of the computer itself.

The most common form of input device is a keyboard. The desktop or portable computers generally have a QWERTY keyboard on which a user can depress keys and receive tactile feedback on which keys are being depressed. There are instances in which a keyboard can be displayed on a screen and the surface of the screen can be contact-sensitive.

A contact-sensitive screen, or touch screen, can be manufactured in various ways, and the overall operation of that screen can vary depending on the technology used. For example, a resistive touch screen generally includes a touch panel, with a resist film placed beneath a transparent film. A grid of dots or spacers are disposed between the films. When the uppermost film is depressed by an object, a spacer is contacted and resistivity is measured depending on where the object depressed the screen within the two-dimensional, x-y coordinates of that screen. An example of a resistive touch screen device is set forth in U.S. Pat. No. 6,628,269, herein incorporated by reference.

While its operation is somewhat similar to a resistive touch panel, another type of touch screen may include a capacitive touch screen. Capacitive touch screens, or panels, typically sense the location of an object on or near the surface of the touch panel based on capacitive coupling between the surface of the touch panel and the object. An example of a capacitive touch panel is set forth in U.S. Pat. Nos. 5,521,336 and 5,943,044, herein incorporated by reference.

While the display can be contact-sensitive and can either yield slightly to pressure from the object, or not, many touch pad surfaces are too small to accommodate all keys of a QWERTY keyboard. In this instance, the display screen will display output from the computer not as a keyboard, but as various icons which can be selected by a user's fingertip, or stylus, brought to bear upon that icon. One example of a computer that primarily utilizes a stylus is a tablet-like personal computer. Other examples might be a cellular telephone, two-way pager, or personal digital assistant (PDA). A tablet personal computer (PC) has grown popular as a keyboard-less device, which allows entry of handwriting upon the tablet. The handwritten information can be stored and sent to a destination, known as "digital ink."

However, if large amounts of data are to be entered upon the tablet surface, tablet PC software sometimes lacks sufficiently accurate handwriting recognition tools for converting the handwriting to alphanumeric characters. Thus, when entering significant amounts of alphanumerical information, the standard QWERTY keyboard reigns supreme.

It would be desirable to implement a computer, preferably a portable computer, having the benefits of a tablet-entry mechanism while at the same time also allowing entry upon a QWERTY keyboard. The portable computer, such as a tablet computer, PDA, or other computing devices which have a display, should preferably maintain its portability and small dimension. A truly portable computer will avoid having to plug into a docking station or receive an external keyboard. Allowing a user to enter information into the portable computer, preferably a portable tablet PC, either as handwriting across a screen, objective (i.e., fingertip or stylus) activation of an icon displayed on a screen, or entry upon a QWERTY keyboard present a significant improvement over conventional portable computers which cannot accommodate all of these various input mechanisms.

SUMMARY OF THE INVENTION

The problems outlined above are in large part solved by an improved computer, more specifically, an improved portable computer having, for example, a tablet-like entry mechanism. The computer hereof includes a transparent input panel that can be placed in a closed or open position. When in the closed position, the input panel is attached to the computer and resides directly over the display screen of that computer. The input panel is preferably transparent so that a user can view the display screen when the input panel is placed over the display screen in its closed position. The input panel can be a contact surface of a tablet portable PC, and can include at least one contact-sensitive surface for receiving a fingertip or stylus for handwriting, digital ink, input or activation of an icon presented on the display screen beneath the input panel.

According to a first embodiment, the input panel includes two contact-sensitive surfaces opposite each other, with each surface being planar. For example, the first planar input surface can be that which faces a user when the input panel is closed. The second planar surface can be that which faces the display screen when the input panel is closed, or the second planar surface can face the user when the input panel is open. By contacting the first planar surface either with a fingertip or a stylus, the contact point on the first surface is registered within the x-y coordinates of the input panel. The mechanism at which the planar surface registers the contact point can be either resistive, capacitive, magnetic, electromagnetic, or acoustic.

When the input panel is opened or "flipped," the second planar surface can be arranged to face the user while the first surface faces away from the user. The second surface can then be that which an object is brought to bear and the position of that object registered within the x-y coordinates of the input panel. A switch may be used to designate which surface (i.e., either the first or second surface) is active. The switch may be built into the housing of the computer, for example, so that it is opened when the input panel is flipped open and closed when the input panel is flipped closed.

According to another embodiment, the input panel can, in addition to flipping open, rotate about its axis. Instead of presenting the second surface to the user when the input panel is opened, the first surface can be presented. In this fashion, only the first surface need be contact-sensitive. Being able to flip open and then rotate the input panel adds some complexity to the hinge that secures the input panel to the computer housing.

Broadly speaking, the present invention contemplates a computer. The computer includes a display screen and a transparent input panel having opposed first and second planar surfaces. A hinge is provided for securing the input panel over the display screen when in a closed position, and secures the input panel away from the display screen when in an open (flipped) position. According to the first embodiment, the hinge comprises a single axis of rotation about which one lateral extent of the input panel rotates relative to one lateral extent of the computer. However, if implemented according to the second embodiment, the hinge comprises two axes of rotation, each perpendicular to the other.

It may be desirable that the input panel need not be contacted when in the closed position in order to register where, within the x-y plane of the input panel, an object is brought near. A contactless mechanism may involve at least two transceivers mounted near the lateral extents of the input panel. The transceivers send and receive, for example, a surface wave or surface acoustic wave (SAW) across the first surface of the input panel. The time delay or propagation delay can be measured and deemed proportional to the distance between the transducers and the object brought near the input panel. That phase delay relative to two or more transducers will triangulate to produce the position of that object relative to the x-y coordinates.

The display screen hereof includes a transparent input panel that can be rotatably secured over the display screen when closed or away from the display screen when opened. A QWERTY keyboard template can be secured against the input panel opposite a surface of the input panel that faces a user when in the opened position. For example, the template can be inserted into grooves near the lateral extents of the input panel to slidably secure the template in position directly beneath the input panel yet visible to a user when typing on the contact-sensitive surface.

A method is provided for entering information upon a computer. The method includes applying a first object to a first planar surface of an input panel detachably secured over a display screen. The input panel can then be rotated away from the display screen to allow a keyboard template to be inserted alongside the first planar surface of the input panel. A second object can be applied to the second planar surface or the first planar surface, depending on whether the input panel is further rotated. Thus, the input panel not only allows a user to see the display screen beneath the input panel when closed, but also allows a user to perform normal tablet personal computer operations on a first surface of the input panel when closed. Yet further, when opened, the input panel can present a QWERTY (or similar type) keyboard that a user can utilize for typing extensive amounts of alphanumeric characters. This allows substantial enhancements to the amount of data that can be entered into, for example, a tablet personal computer.

BRIEF DESCRIPTION OF THE DRAWINGS

Further advantages of the present invention may become apparent to those skilled in the art with the benefit of the following detailed description of the preferred embodiments and upon reference to the accompanying drawings in which.

Figure 1:
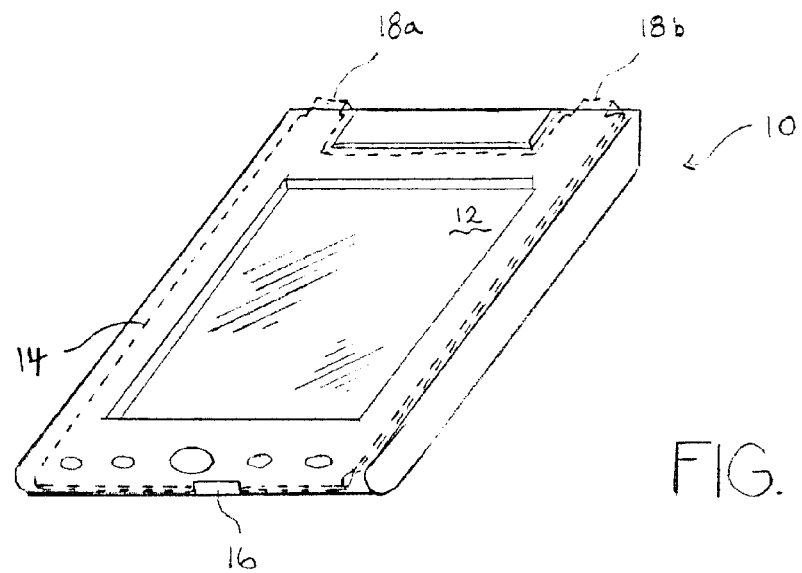
FIG. 1 is a front elevation plan view of a portable computer having an input panel shown in phantom and in a closed position, with a top surface of the input panel extending outward from the computer and a bottom surface of the input panel facing a display screen of the computer.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, FIG. 1 illustrates a computer 10. Preferably, computer 10 is a portable computer, such as a tablet PC, or PDA. As a tablet PC, computer 10 includes a display screen 12. The display screen can be any display device that presents text or objects. A popular display device might be a liquid crystal display. Shown in phantom and in a closed position, an input panel 14 is secured to computer 10. Input panel 14 is preferably rotatably secured via hinge 16. Hinge 16 attaches the housing of computer 10 to one end of input panel 14. The other end of input panel 14 can have, for example, a pair of tabs 18a/18b. Tabs 18 bias outward and then the distal ends of each tab 18 secure over mating ridges on the housing of computer 10, when input panel 14 is closed. Tabs 18 ensure input panel 14 remains closed and securely fastened to computer 10.

When closed, an upper planar surface is presented to user. The upper planar surface is known as the first planar surface. Opposite the first planar surface is a second planar surface. The second planar surface faces the display screen 12 and is spaced slightly above the display screen 12. The first and second planar surfaces are better illustrated in FIG. 2 as reference numerals 20 and 22, respectively. According to one feature of a tablet PC, surface 20 can accommodate a stylus input device, for receiving handwritten information and storing such as digital ink.

Figure 2:
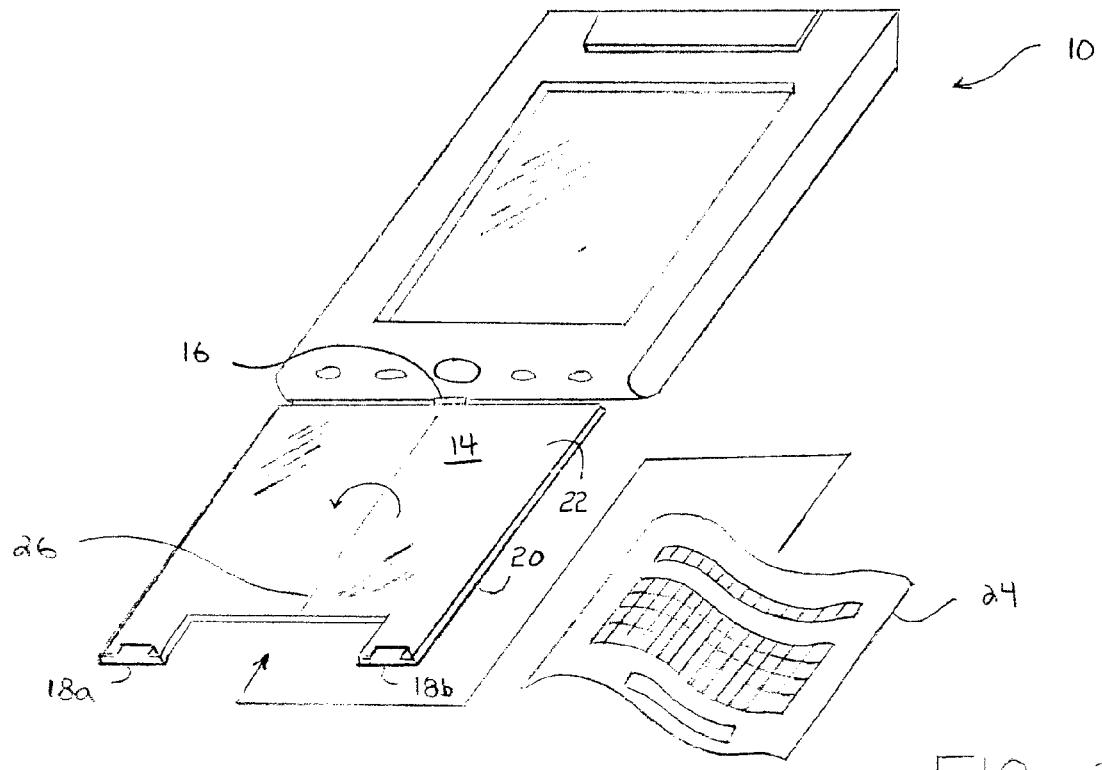
FIG. 2 is a front elevation plan view of the portable computer of FIG. 1, with the input panel flipped outward from the display screen to present the bottom surface facing a user and the top surface onto which a keyboard template is inserted or, alternatively, the input panel can be flipped and then rotated 180° to present the top surface to the user and the bottom surface for receiving the keyboard template.

FIG. 2 illustrates input panel 14 in an opened or "flipped" position. When opened, the first planar surface 20 extends away from a user, while the second planar surface 22 extends toward a user. Thus, hinge 16 comprises an axis of rotation parallel to lateral extents of computer 10 and input panel 14. Specifically, the axis of rotation is between computer 10 and input panel 14, and along a pair of parallel-spaced extents. Input panel 14 is opened by applying slight pressure to tabs 18a/18b to release the mating ridges thereof.

A template 24 can be used and inserted into, for example, retaining grooves along the first planar surface. By inserting template 24 into those grooves, template 24 is maintained adjacent the first surface 20, and beneath the input panel 14 when opened. Input panel 14, however, is transparent to allow a user to see the pattern drawn on template 24. A user can depress his or her fingertips onto the contact-sensitive surface 22 and the coordinate positions are registered corresponding to various keys of, for example, a QWERTY keyboard drawn on template 24. Accordingly, when opened, input panel 14 functions as a keyboard for entry of alphanumeric information into computer 10.

According to another embodiment, hinge 16 can have two axes of rotation each perpendicular to the other. For example, after being opened, input panel 14 can be rotated about axis 26. Once opened and rotated, the first planar surface 20 is then presented to the user rather than the second surface 22. According to this embodiment, only the first surface need be contact sensitive. The second surface will, therefore, essentially be a "dummy" transparent surface whereby any contact thereto will not be registered within computer 10. Manufacture of an input panel with dual-side contact surfaces is considerably more complex than a single contact-sensitive surface. However, manufacture of a hinge 16 when can rotate in two axes can also be more complex and less reliable than a hinge 16 that rotates within a single axis. FIGS. 3-6 describe various single-side or dual-side contact-sensitive surfaces, corresponding position detection engines, and the overall architecture of contact-sensitive surfaces relative to a computer.

Figure 3:
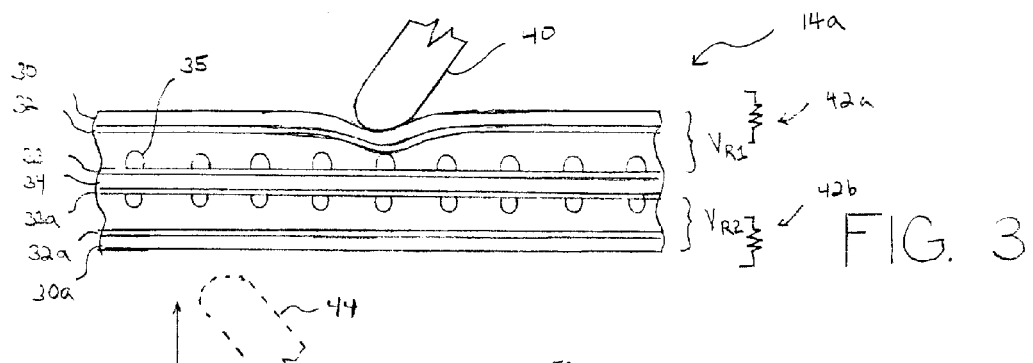
FIG. 3 is a partial cross-section view of a resistive input panel, according to one embodiment, that is sensitive to touch on either a single surface or both, opposing surfaces of the input panel.

Turning to FIG. 3, a dual- or single-side, resistive input panel 14a is shown according to one embodiment. Input panel 14a may include a transparent film 30, a first transparent resistive film 32, a second transparent resistive film 33, a glass substrate 34, and various spacers 35 disposed at regular intervals between resistive films 32 and 33. Films 30 and 32 can be flexible and can include polyethylene terephthalate (PET) material that will yield when depressed by a finger or stylus 40. Film 32 can include a conductive film made up, for example, indium ten oxide (ITO) or $SnO_2$. Likewise, film 33 can also be a conductive film. A voltage potential exists across film 32 along an x dimension, whereas another voltage potential exists across film 33 along a y dimension. When depressed, contact is made between films 32 and 33 via spacers 35. This will cause a resistive reading along the x-y dimensions based on where object 40 contacts panel 14a. Details of resistive, contact-sensitive surfaces and the operations thereof are noted in U.S. Pat. No. 6,628,269.

In addition to resistive films placed on one surface, resistive films can be placed on an opposing surface. The combination of resistive films are designed as $V_{R1}$ and $V_{R2}$ depending on which surface (either the first or second) the resistive film is placed. On the second surface, resistive films 32a and 33a are spaced from each other similar to films 32 and 33. Films 30a, 32a, and 33a are made of the same material as films 30, 32, and 33. Resistors 42a/42b designate a resistive contact surface for both the first and second surfaces. Accordingly, a second object 44 (shown in phantom) can be brought against the second surface when, for example, the second surface is presented to the user at times in which the input panel is opened.

Figure 4:
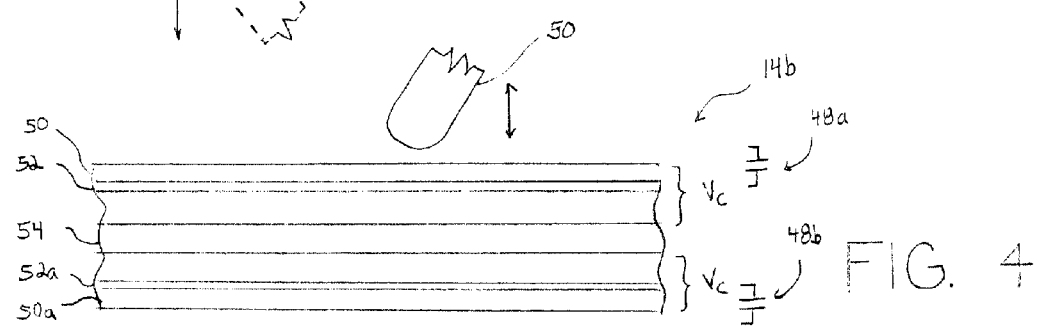
FIG. 4 is a partial cross-sectional view of a capacitive input panel, according to another embodiment, that is sensitive to touch on either a single surface or both, opposing surfaces of the input panel.

FIG. 4 illustrates a capacitive contact surface placed on both the first and second surfaces, for example, the capacitive surfaces are noted as such by reference numerals 48a/48b. One advantage of a capacitive contact surface is that input panel 14b, according to the embodiment of FIG. 4, can sense the location of an object 50 brought on or near the surface of panel 14b. Specifically, object 50 and the voltage plane 52, which lies beneath a transparent film 50, bear voltages. The voltage amounts are capacitively coupled to each other based on where object 50 is located relative to the surface of input panel 14b. Like the resistive input panel 14a, input panel 14b can also be dual-sided with conductive planes 52 and transparent film 50 replicated on a quartz substrate 54, referenced as 52a and 50a. Capacitive input panels that do not require contact or at least do not require significant pressure contact, may be better suited for the surface on which fingertips are brought to bear when implementing keyboard entry, for example. Typically, keyboard entry will require some palpable feedback to inform the user that his/her fingertips have contacted the region under which a key on a template exists. That palpable feedback can come primarily from a contact-sensitive surface, not one that is contactless.

FIGS. 3-4 illustrate dual-sided contact or contactless surfaces. Yet, however, if the hinge can be rotated in two axes as shown in FIG. 2, then only one contact or contactless surface need be present. It is possible, however, to implement one surface as a resistive contact surface and the other opposing surface as a capacitive coupling surface that can be contact or contactless. It may also be possible to implement one surface as a contact surface (either resistive or capacitive) and the other surface as an acoustic or magnetic surface. Alternatively, both opposing surfaces can be acoustic, magnetic, electromagnetic, and so forth. It is contemplated that all different variations of single- or dual-side surfaces, either contact or contactless, are envisioned.

Figure 5:
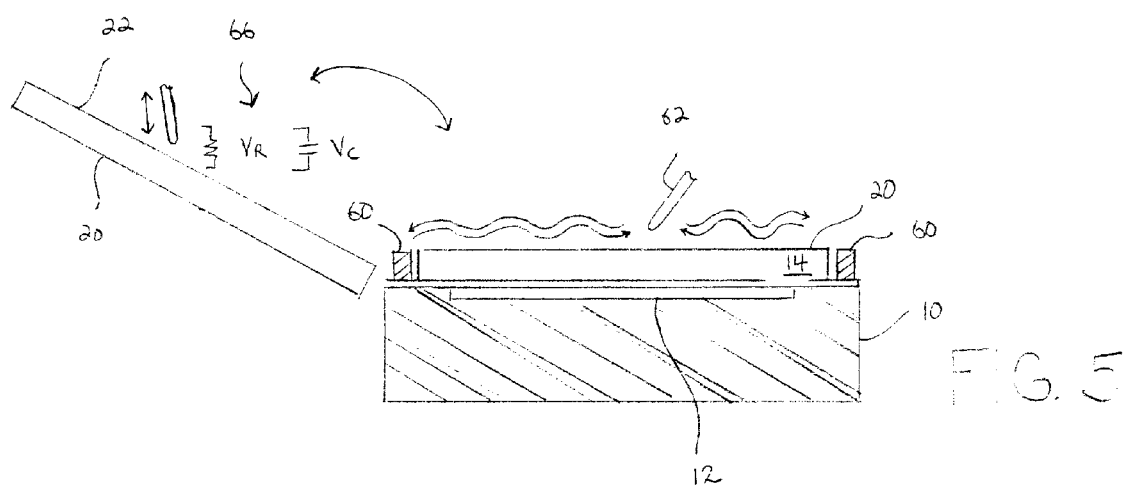
FIG. 5 is a partial cross-sectional view of the portable computer of FIG. 2, with the input panel flipped open and having both surfaces be either resistive or capacitive surfaces, or one surface being resistive or capacitive and the opposing surface, when the input panel is closed, be acoustic.

FIG. 5 illustrates an acoustic version of a contact surface, possibly the first surface 20 when placed in a closed position. Transceivers 60, of which there are at least two, are positioned along lateral extents of input panel 14. Transceivers 60 send and receive optical or acoustic waves across the first surface 20, for example. Acoustic waves are received back upon the receiver of transceivers 60. Depending on the strength of the received signal, the position of object 62 can be determined. Details of an acoustic detection engine and the various transducers which form its operation as well as the surface acoustic wave (SAW) description are set forth in U.S. Pat. No. 7,157,649. When flipped open, the first surface 20 faces downward and away from a user, whereas the second surface 22 faces upward provided, of course, input panel 14 is not further rotated along axis 26 (FIG. 2). The second surface 22 can be either a resistive or capacitive surface as shown by reference numerals 66.

Figure 6:
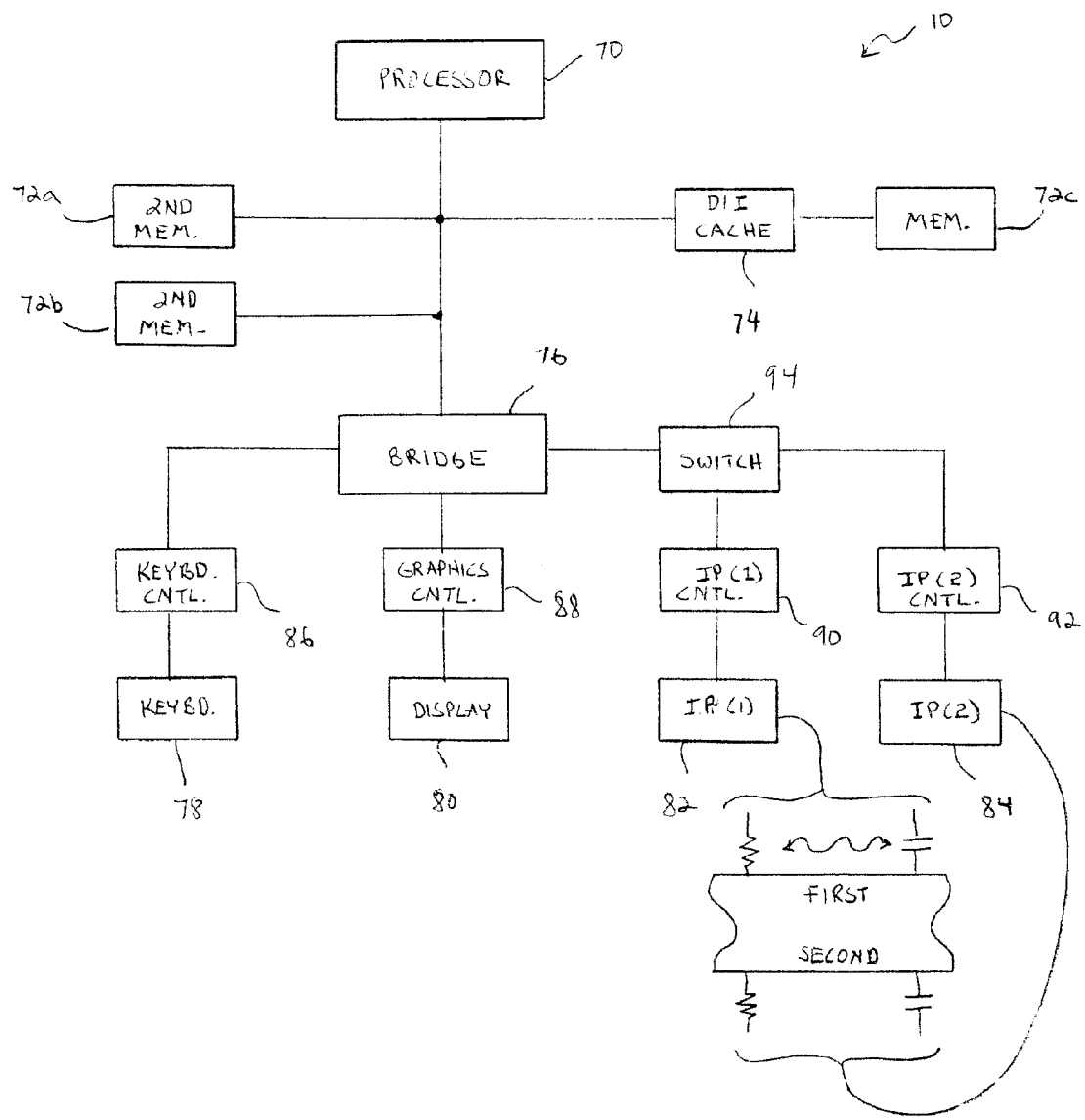
FIG. 6 is a block diagram of the portable computer, a switch to select which surface is active and to determine the position at which an object contacts or is brought near a surface of the input panel.

FIG. 6 illustrates some of the various subsystems of computer 10. Included with a processor or execution engine 70 is a local bus across which data and instructions are sent. The local bus connects various forms of memory 72 to processor 70. One form of memory, e.g., memory 72c, can be high-speed memory and can include data and instructions that can be temporarily stored in cache memory 74. The local bus can be interfaced or bridged with other buses, for example. A bus bridge 76 can couple various peripheral devices, such as keyboard 78, display 80, and contact-sensitive surfaces 82 and 84. Surface 82 may be the first surface, whereas surface 84 may be the second surface. A keyboard controller 86 may be used to communicate information from keyboard 78 to processor 70, for example. Keyboard controller 86 and keyboard 78 can be, for example, plugged in to computer 10. Alternatively, an input panel having opposed first and second surfaces 82 and 84 can be used.

While graphics controller 88 drives display 80, input panel controllers 90 and 92 contain position detection engines that determine the position at which an object contacts the respective first surface 82 and second surface 84. If a dual-surface embodiment is used, it may be necessary that when the input panel is opened, the first surface be deactivated and the second surface activated. A switch 94 is used to achieve activation and deactivation. Switch 94 deactivates, for example, the first surface when the input panel is opened, and activates the first surface when the input panel is closed. Moreover, when the input panel is closed, switch 94 can deactivate the second surface. This prevents inadvertent contact on the deactivated surface from interfering with coordinate detection on the activated surface. If, however, the hinge is rotated about two axes, then two contact surfaces are not used and only a single contact surface is needed. Accordingly, switch 94 is not used, nor is controller 92 and second surface 84.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer, comprising:
   a display screen;
   a transparent input panel having opposed first and second planar surfaces, wherein the first and second surfaces are contact sensitive and configured for receiving user input;
   grooves formed in the input panel to slidably accommodate a flexible template with QWERTY key markings;
   a hinge that secures the input panel over the display screen when in a closed position, and secures the input panel away from the display screen and any other objects of the computer when in an opened position; and
   a switch for deactivating the first planar surface and activating the second planar surface when the input panel is rotated about the hinge and secured in the open position.

2. The computer as recited in claim 1, wherein said first surface faces a user and said second surface faces the display screen when the hinge is in the closed position.

3. The computer as recited in claim 1, wherein said first surface faces away from a user and the second surfaces faces a user when the hinge is in the opened position.

4. The computer as recited in claim 1, wherein said hinge comprises an axis about which one lateral extent of the input panel rotates relative to one lateral extent of the computer.

5. The computer as recited in claim 1, wherein at least one of the first and second surfaces comprise a resistive film or a capacitive film.

6. The computer as recited in claim 1, further comprising at least two transceivers mounted on the computer near lateral extents of the input panel for measuring acoustic, magnetic, electromagnetic or optical signals transmitted across the first surface.

7. The computer as recited in claim 6, wherein the transceivers are adapted for transferring a signal between an object placed proximate to the first surface and the transducers, wherein the transferred signal is measured by circuitry coupled to the transceivers as being proportional to a position of the object relative to the two-dimensional coordinates of the input panel.

8. The computer as recited in claim 1, further comprising the flexible template with QWERTY key markings, wherein the flexible template is slidably inserted into the grooves formed in the input panel to secure the template adjacent to the first or second planar surface.

9. The computer as recited in claim 8, wherein the QWERTY key markings on the flexible template are visible through the input panel.

10. A computer, comprising:
    a display screen;
    a transparent input panel having opposed first and second planar surfaces, wherein the input panel is adapted for rotatable securement over the display screen when in a closed position and away from the display screen and any other object associated with the computer when in an open position; and
    a QWERTY keyboard template for slidable insertion into grooves formed on the first planar surface of the input panel to secure the template against the first planar surface of the input panel so that a user can enter information into the computer via the second planar surface when the input panel is secured in the open position.

11. The computer as recited in claim 10, wherein the display screen is visible through the input panel when in the closed position and only the template is visible through the input panel when in the open position.

12. The computer as recited in claim 10, wherein at least one of the first and second planar surfaces of the input panel is contact sensitive.

13. The computer as recited in claim 12, wherein the at least one contact sensitive planar surface comprises a resistive film or a capacitive film.

14. The computer as recited in claim 10, further comprising at least two transceivers mounted proximate lateral extents of the input panel for measuring acoustic, magnetic, electromagnetic or optical signals transmitted across the input panel.

15. The computer as recited in claim 10, further comprising a hinge that rotatably secures the input panel over the display screen when in the closed position and away from the display screen when in the open position, wherein the hinge comprises first and second axes of rotation that are substantially perpendicular to each other, and wherein the input panel rotates about the first axis of rotation to secure the input panel in one of the open and closed positions, and about the second axis of rotation to selectively present the first planar surface or the second planar surface to the user when the input panel is secured in the open position.

16. A method for entering information upon a computer, comprising: applying a first object to a first planar surface of an input panel detachably secured over a display screen; rotating the input panel away from the display screen; further rotating the input panel about an axis extending through the input panel perpendicular to the axis around which the input panel rotates away from the display screen; slidably inserting a keyboard template into grooves formed on a second planar surface of the input panel; and applying a second object to the first planar surface, whereby only the first planar surface of the first and second planar surfaces is contact-sensitive.

17. The method as recited in claim 16, wherein said first object comprises a stylus or fingertip, and wherein said second object comprises a fingertip.

* * * * *